Jan. 21, 1930.    L. HAMMOND    1,744,268
ELECTROLYTIC CONDENSER STRUCTURE
Filed Dec. 9, 1926    2 Sheets-Sheet 1

Inventor
Laurens Hammond
by Parker & Carter
Attorneys.

Jan. 21, 1930.  L. HAMMOND  1,744,268
ELECTROLYTIC CONDENSER STRUCTURE
Filed Dec. 9, 1926  2 Sheets-Sheet 2
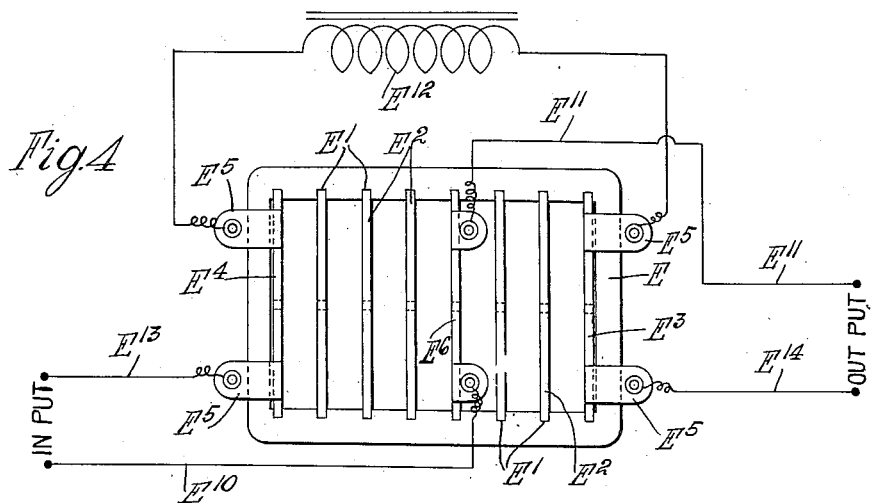
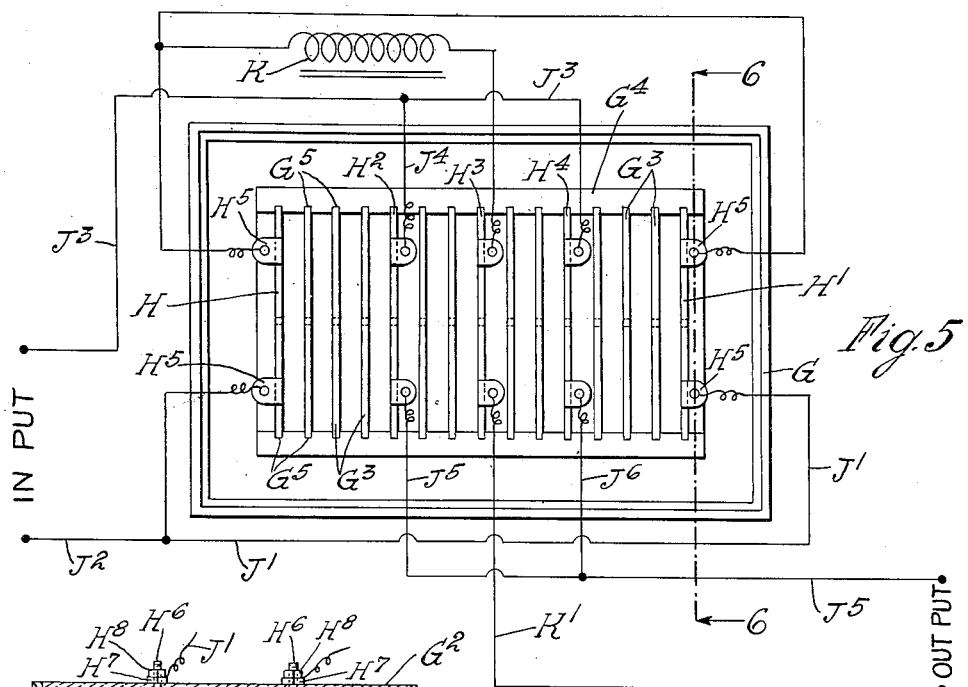
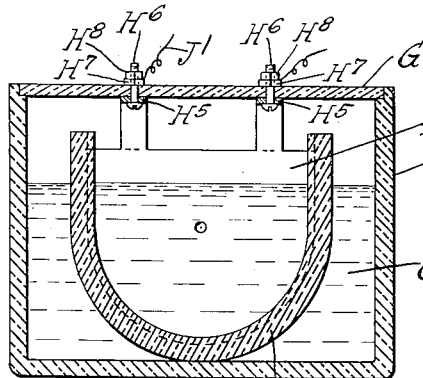
Inventor
Laurens Hammond
by Parker & Carty
Attorneys.

Patented Jan. 21, 1930

1,744,268

UNITED STATES PATENT OFFICE

LAURENS HAMMOND, OF CHICAGO, ILLINOIS, ASSIGNOR TO THE ANDREWS-HAMMOND CORPORATION, OF CHICAGO, ILLINOIS, A CORPORATION OF ILLINOIS

ELECTROLYTIC CONDENSER STRUCTURE

Application filed December 9, 1926. Serial No. 153,488.

This invention relates to an improvement upon and to a method of construction of an electrolytic condenser of the general type described and claimed in the co-pending Edward F. Andrews application 101,347, filed April 12, 1926. By an electrolytic condenser I mean a cell having two or more electrodes and an electrolyte which substantially blocks the flow of direct current through it below a certain potential difference between its electrodes, and which functions as a condenser.

A purpose of said invention and of the invention of the present application is to provide an electrolytic cell adapted to function as a condenser in circuits carrying pulsating, alternating or surging currents, which shall have a relatively high capacity, particularly at low voltage, which shall be capable of receiving a complete charge and of discharging completely almost instantaneously and which shall be capable of long periods of use or disuse with a minimum of deterioration. The said electrolytic condenser is particularly well suited for use in filter circuits for removing the pulsations from intermittent direct current and converting its energy into uniform direct current.

A further object is the provision of an electrolytic condenser which shall be easy and cheap to manufacture and economical to use. Other objects will appear from time to time in the course of the specification and claims.

I illustrate my invention more or less diagrammatically in the accompanying drawings, wherein—

Figure 4 is a plan view, with an accompanying circuit diagram, of a variant form of condenser;

Figure 5 is a similar plan view and circuit diagram of a further variation with the cover plate removed; and Figure 6 is a section on the line 6—6 of Figure 5.

Like parts are indicated by like symbols throughout the specification and drawings.

Figure 1:
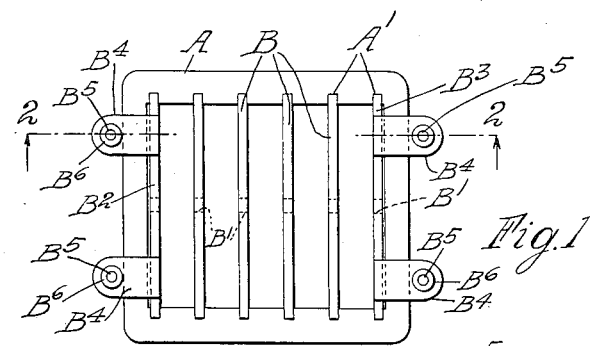
Figure 1 is a plan view of a simple form of my condenser.
Figure 2:
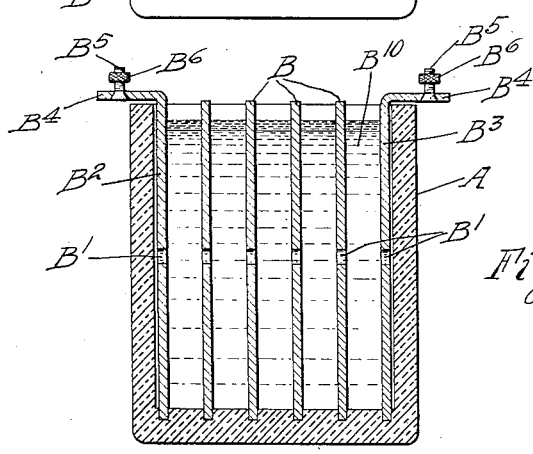
Figure 2 is a section on the line 2—2 of Figure 1.

Referring to Figures 1 and 2 I employ a container A which may be hard rubber or any other suitable non-conducting material. The opposed sides are slotted as at $A^1$ to receive a plurality of thin metal plates B, the plates being preferably apertured, as at $B^1$, below the level of the electrolyte $B^{10}$. The end plates $B^2$ $B^3$ of the series are each provided with terminals $B^4$, each with a binding post $B^5$ and nut $B^6$.

Figure 3:
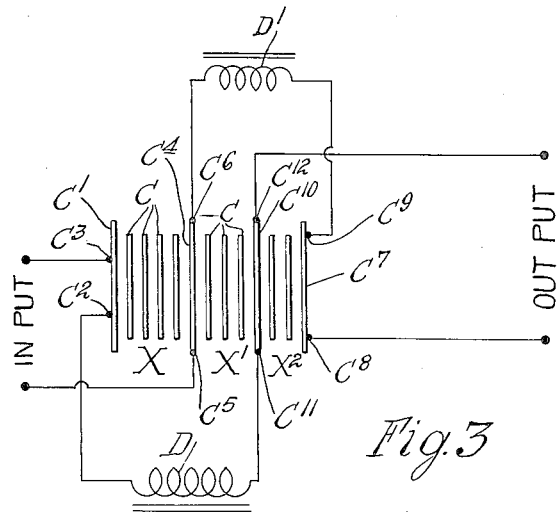
Figure 3 is a circuit diagram of a variant form of condenser.

Referring to Figure 3, it will be understood that the same type of container may be employed, the plates C corresponding to the plates B of Figures 1 and 2. I split the series of plates, however, into three groups, indicated as $x$, $x^1$, $x^2$. The group $x$ is herein shown as having five cells C, and a terminal plate $C^1$ with the terminals $C^2$ and $C^3$ upon it. The group $x^1$ has four cells and between it and the group $x$ is a common terminal plate $C^4$ with the terminals $C^5$ $C^6$ thereupon. The group $x^2$ has but three of the cells, the group being completed by the terminal plate $C^7$ with the terminals $C^8$ and $C^9$. It shares with the group $x^1$ the intermediate terminal plate $C^{10}$ with its terminals $C^{11}$ and $C^{12}$.

In the wiring diagram, as shown in Figure 3, choke coils D and $D^1$ are employed, the choke coil D being interposed between the terminal plates $C^1$ and $C^{10}$ and the choke coil $D^1$ between the terminal plates $C^4$ and $C^7$.

Referring to Figure 4, E is a container of insulating material slotted as at $E^1$ to receive a plurality of plates $E^2$ serving as electrodes for the cells so formed. The end plates $E^3$ $E^4$ are provided with a plurality of terminals $E^5$, as is an intermediate plate $E^6$. The cells thus formed are divided by the intermediate plate $E^6$ into two series, each having a different number of cells. The plate $E^6$ serves as a uni-polar electrode for the adjacent cells of the two series. The two terminals of the plate $E^6$ are connected by the conductors $E^{10}$ $E^{11}$ to the input and output respectively. A choke coil $E^{12}$ is connected in circuit with the terminal plates $E^3$ $E^4$ and the second terminals of said end plates are connected to the input and output respectively by the conductors $E^{13}$ $E^{14}$.

Referring to Figures 5 and 6, G indicates an outer container in which is a body of electrolyte $G^1$. $G^2$ is a cover therefor. Positioned within the electrolyte $G^1$ are a plurality of parallel plates $G^3$ the function of which is identical with the plates $E^2$ of Figure 4. These plates are herein shown as arcuately formed and are spaced and insulated from each other by a holding member $G^4$ which may be a sheet of insulating material slotted as at $G^5$ to receive the edges of the plates, and which is bent about them in such fashion as firmly to grip them. In the manufacture of the device the sheet may be heated when flat and the plates may be thrust downwardly thereagainst to bend or curl it about their edges.

The electric circuit shown in Figure 5 is in effect identical with that of Figure 4, save that the two series of plates and cells shown in Figure 4 are each split or divided. The end plates H $H^1$ and the intermediate plates $H^2$ $H^3$ and $H^4$ are each provided with terminals $H^5$ which may be secured to the cover $G^2$ by the bolts $H^6$ which serve as binding posts, in connection with the supporting nuts $H^7$ and the securing nuts $H^8$.

The end plates H, $H^1$ are connected by the conductors J, $J^1$, and through $J^1$ and $J^2$ they are both connected with the input. $J^3$ is a conductor extending from the input to the intermediate plate $H^4$, and through the branch $J^4$ to the intermediate plate $H^2$, the plates $H^2$ and $H^4$ being thus connected. $H^2$ and $H^4$ are similarly connected to the output by the line $J^5$ and the branch $J^6$. Connected between the intermediate plate $H^3$ and the end plate H is the choke coil or inductance K, the plate $H^3$ being also connected by the line $K^1$ with the output. It will thus be clear that the end plates H and $H^1$ may be taken as the equivalent of the end plate $E^3$ of Figure 4, the intermediate plate $H^3$ is the equivalent of the end plate $E^4$ of Figure 4 and the intermediate plates $H^2$ and $H^4$ are together the equivalent of the intermediate plate $E^6$ of Figure 4.

It will be realized that whereas I have described and shown a practical and operative device, many changes might be made in size, shape, location and disposition of parts, in wiring connections and in location and connection of the various series of cells, without departing from the spirit of my invention. I therefore wish my description and drawings to be taken as in a broad sense diagrammatic and illustrative rather than as limiting me to my specific description and showing.

The use and operation of my invention are as follows:

The uses for which my electrolytic condenser is adapted are in general those requiring a condenser of unusually large capacity. I may employ electrodes or cell partition plates of iron or a metal of the iron group, and I may employ an alkaline electrolyte, for example an aqueous solution of potassium hydroxide. The operation of my electrolytic condenser, when used in the circuits herein shown for the purpose of smoothing pulsating current is as follows:

During that part of the cycle at which the voltage is high, current flows from the circuit into the electrolytic condenser. A portion of the electrolyte is decomposed, forming nascent oxygen and hydrogen, the hydrogen being absorbed into the surface of the negative electrode and the oxygen into the surface of the positive electrode.

If a choke coil or inductance is placed in the circuit between one of the electrolytic condensers and the load, it will tend to oppose any change in the current flowing through it and will add its effect to the effect of the electrolytic condenser, tending to maintain a uniform voltage across the load.

It will be noticed that in connection with any filter circuit such as above mentioned, there is a portion of the circuit through which alternating current flows. The current through the condensers thus is alternating current, on which is superimposed a small direct current which is necessary in order to maintain a potential across the cells. Should the portion of a filter circuit through which alternating current flows contain any appreciable amount of resistance, it will follow that the efficiency of the device as a current filter will be seriously impaired, owing to the fact that the line potential relative to the condenser potential will rise during the time when the condensers are being charged and will fall correspondingly during the time the condensers are being discharged. In the practical construction of electrolytic condensers of the type herein described, it has been found that great care is required in order to reduce as much as possible the internal resistance of the condenser and the resistance of the connections from the circuit to the condenser. The cell construction herein disclosed is particularly well suited for this type of condenser, in view of the fact that there are no electrical connections between adjoining cells in the structure. The path for the current from cell to cell is as short as the plates are thin, and is of as large a cross-section as the total area of the plate.

Referring to Figures 3, 4 and 5, the expedient of dividing the condenser into separate condenser units, or groups of cells, there being an unlike number of cells in each group, is of importance, in order to maintain an equal average voltage across the cell groups or condensers on either side of the inductances employed. This conception is broadly covered in the co-pending application 128,959, of Edward F. Andrews, filed on the 13th day of August, 1926. In employing this principle I proportion the value of the resistance of the inductance and select such a number of cells in the individual cell groups or condensers as will result in the operation of the condensers with a predetermined average voltage across each electrolytic cell. I thereby maintain the voltage across the individual cells at a generally constant and predetermined voltage.

Referring again to Figures 5 and 6, I employ a particularly convenient and easily assembled unit in which a number of parallel partition and electrode plates are formed with arcuate bottoms. These plates may be positioned in any suitable securing means, in order to be thrust against the securing member $G^4$, which may be heated in order to permit its bending under said thrust. When cooled it is permanently formed as shown in Figure 6, and grips the edges of the plates, which are set in the slots $G^5$. Whereas I find this a convenient way of forming the securing member $G^4$, it will be understood that it may be otherwise formed, such as by moulding. I therefore wish it understood that when in my claims I claim a sheet of insulating material bent to conform to the edges of the plates I wish the term "bent" to be understood as being drawn to cover the form of member and not the method of its formation. I find it convenient to secure the condenser unit to the cover $G^2$, the bolts $H^6$ serving at the same time as securing means and binding posts.

In all the forms herein shown the individual plates are apertured in order to permit a flow of the electrolyte from compartment to compartment, to maintain the level in the compartments. Such apertures are convenient, but may be dispensed with. In the form of Figures 5 and 6 I position a condenser unit in a relatively large body of electrolyte $G^1$, the unit, as above described, being suspended from the cover plate $G^2$. In the assembly, as shown in Figure 5, the unit may be suspended in the body of electrolyte $G^1$, and it makes no difference whether or not there is a path through the liquid between the two terminal plates, the plates being electrically connected, and functionally forming one element. This is in contrast to the form of Figure 4, where a connection between the two end plates would short the choke coil and would impair the filter action. Hence, although it is necessary to house the condenser of Figure 4 in a water tight container, the condenser of Figures 5 and 6 may be suspended in any open can or container, the member $G^4$ serving merely as a spacing and insulating unit. It is immaterial whether the same amount of surface is in one or two series of plates or cells, the series being in parallel, so far as the operation of the device is concerned.

Whereas the structures herein disclosed are adaptable for employment in condensers in which metals of the iron group are employed, I wish it to be understood that my invention is not limited to the use of this structure with any particular or specifically stated metal or electrolyte and I have instanced plates of iron or a metal of the iron group, in an alkaline electrolyte, to indicate a practical combination of materials which may be employed in embodying my structure.

I claim:

1. An electrolytic condenser structure comprising a non-conducting container, a plurality of metallic partition plates positioned in said container and insulated from each other thereby, and adapted to separate the interior of the container into a plurality of separate cells, an electrolyte in each of the cells so formed, each of said partition plates being adapted to serve as an electrode for the cells it adjoins, said plates being vented beneath the normal level of the electrolyte to permit a circulation of electrolyte from cell to cell.

2. An electrolytic condenser structure comprising a container, a plurality of insulated metallic partition plates therein, an electrolyte in the spaces between such plates, the plates being adapted to serve as electrodes for the cells so formed, conductors extending from an intermediate plate, conductors extending from the end plates and an impedance, one end of the impedance being conductively connected to the end plates.

3. An electrolytic condenser structure comprising a container, a plurality of insulated metallic partition plates therein, an electrolyte in the spaces between such plates, the plates being adapted to serve as electrodes for the cells so formed, conductors extending from an intermediate plate, conductors extending from the end plates and an impedance, one end of the impedance being conductively connected to the end plates, said cells being divided by said intermediate plate into a plurality of groups, there being an unequal number of cells in said groups.

4. In an electrolytic condenser structure, a container, an electrolyte in said container, a plurality of metal electrode plates positioned in said electrolyte, a holding member therefor adapted to space and insulate them from each other, and means for positioning said holding member and said plates within the electrolyte, said plates being vented beneath the normal level of the electrolyte to permit the passage of said electrolyte through said plates and into the spaces therebetween.

5. In an electrolytic condenser structure, a container, an electrolyte in said container, a plurality of metal electrode plates positioned in said electrolyte, a holding member therefor adapted to space and insulate them from each other, and means for positioning said holding member and said plates within the electrolyte, said holding member being adapted to close the space between said plates to form separate cells, the terminal plates being exposed to the main body of the electrolyte.

6. In an electrolytic condenser structure, a container, an electrolyte in said container, a plurality of generally parallel closely spaced metal plates suspended in the electrolyte, and a spacing and insulating member therefor comprising a sheet of insulating material bent to conform to the edges of said plates the lower portion of said plates being arcuately formed.

7. In an electrolytic condenser structure, a container, an electrolyte in said container, a plurality of generally parallel closely spaced metal plates suspended in the electrolyte, and a spacing and insulating member therefor comprising a sheet of insulating material bent to conform to and grip the edges of said plates, said sheet being slotted to receive such edges.

8. An electrolytic condenser structure comprising a container, a plurality of insulated, spaced metallic partition plates therein, an electrolyte in the spaces between such plates, the plates being adapted to serve as electrodes for the cells so formed, conductors extending from the end plates and from a plurality of intermediate plates, the end plates being conductively connected with each other, and an impedance connected between the end plates and an intermediate plate.

9. An electrolytic condenser structure comprising a container, a plurality of insulated, spaced metallic partition plates therein, an electrolyte in the spaces between such plates, the plates being adapted to serve as electrodes for the cells so formed, conductors extending from the end plates, the end plates being conductively connected, conductors extending from a pair of intermediate plates, the intermediate plates being conductively connected and conductors extending from a central plate, located between the two intermediate plates, and an impedance connected between the central plate and the end plates.

10. An electrolytic condenser structure comprising a container, a plurality of insulated, spaced metallic partition plates therein, an electrolyte in the spaces between such plates, the plates being adapted to serve as electrodes for the cells so formed, the end plates of the series being conductively connected.

11. An electrolytic condenser structure comprising a container, a plurality of insulated, spaced metallic partition plates therein, an electrolyte in the spaces between such plates, the plates being adapted to serve as electrodes for the cells so formed, the end plates of the series being conductively connected, and an impedance connected between the end plates and an intermediate plate.

12. An electrolytic condenser unit comprising a plurality of separate condensers each one of which is composed of a plurality of cells connected in series, two of said condensers occupying a position at opposite ends of the condenser unit and being connected in parallel with each other and two of said condenser units occupying a position at either side of the center of said unit and being connected in parallel with each other, said condensers being separated by plates having the same polarity on both sides and to which the connections of the condenser are made.

13. An electrolytic condenser structure comprising a non-conducting container, an electrolyte in said container, a plurality of flat metal electrode plates positioned in said electrolyte in generally vertical planes, the upper edges of said plates extending above the level of the electrolyte, the edges of the plates beneath the electrolyte being in sealing contact with said container, and vents, beneath the normal level of the electrolyte, adapted to permit a circulation of electrolyte from cell to cell, said vents being of size insufficient to permit any substantial electrical short-circuiting of individual cells.

14. An electrolytic condenser comprising a plurality of metal partitions, each electrically insulated from its neighbor, said partitions lying in vertical and generally parallel planes, a container for said partitions, said container being in sealing relation with the edges of said partitions, bodies of electrolyte disposed between said partitions, said partitions and the cells formed thereby being electrically divided into a plurality of groups, and a partition plate between each such pair of groups, said plate being adapted to serve as an electrode for an adjoining cell of each group.

15. In an electrolytic condenser structure, a plurality of cells formed by a plurality of groups of plates, the plates lying in generally parallel, generally vertical planes, an electrolyte in the space between said plates, each plate being adapted to serve as an electrode for the cell or cells the electrolyte of which it engages, and a plate positioned between said groups, the opposite sides of said plate being adapted to serve as electrodes of like polarity for adjoining cells.

16. In an electrolytic condenser structure, a container, an electrolyte in said container, a plurality of metal electrode plates positioned in said container, a holding member therefor adapted to space and insulate them from each other, the edges of said plates being in sealing contact with said holding member, and means for positioning said holding member and said plates within the body of electrolyte in the container.

17. In an electrolytic condenser structure, a container, an electrolyte in said container, a plurality of metal electrode plates positioned in said container, a holding member therefor adapted to space and insulate them from each other, the edges of said plates being in sealing contact with said holding member, means for positioning said holding member and said plates within the body of electrolyte in the container, and a cover for said container, said holding member and plates being suspended from said cover.

18. An electrolytic condenser unit comprising a plurality of separate condensers, each condenser composed of a plurality of cells in series, said condensers being separated by a partition plate adapted to serve as a unipolar electrode, the individual cells of each condenser being separated by bi-polar electrode partitions, such electrodes lying in generally vertical, generally parallel planes, and a container within which said electrodes are positioned, the edges of said electrodes being in sealing contact with said container.

19. In an electrolytic condenser structure, a container, an electrolyte in said container, a plurality of generally parallel closely spaced metal plates suspended in the electrolyte, and a spacing and insulating member therefor comprising a body of insulating material conforming to the edges of said plates the lower portion of said plates being arcuately formed.

Signed at Chicago, county of Cook and State of Illinois, this 3rd day of December 1926.

LAURENS HAMMOND.